(12) United States Patent
Matsuyama

(10) Patent No.: US 6,857,798 B2
(45) Date of Patent: Feb. 22, 2005

(54) PRINTING APPARATUS AND METHOD FOR NO-MARGIN PRINTING

(75) Inventor: Ichiro Matsuyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/618,666

(22) Filed: Jul. 15, 2003

(65) Prior Publication Data

US 2004/0013455 A1 Jan. 22, 2004

(30) Foreign Application Priority Data

Jul. 17, 2002 (JP) ........................................ 2002-208886
Jun. 27, 2003 (JP) ........................................ 2003-185875

(51) Int. Cl.[7] .......................... B41J 11/44; B41J 2/315; B41F 1/54
(52) U.S. Cl. ................. 400/76; 400/615.2; 400/120.01; 101/484
(58) Field of Search ................................ 400/76, 615.2, 400/120.01; 101/484; 347/22; 358/1.2, 1.18; 399/194, 82, 182, 81, 376

(56) References Cited

U.S. PATENT DOCUMENTS

| | | | | |
|---|---|---|---|---|
| 5,121,468 A | * | 6/1992 | Daino | 358/1.2 |
| 5,311,259 A | * | 5/1994 | Moriya et al. | 399/86 |
| 5,551,785 A | * | 9/1996 | Mori et al. | 400/76 |
| 5,795,086 A | * | 8/1998 | Watanabe et al. | 400/615.2 |
| 5,805,955 A | * | 9/1998 | Aoki | 399/45 |
| 5,951,174 A | * | 9/1999 | Handa | 400/120.01 |
| 5,995,196 A | * | 11/1999 | Nishida et al. | 355/40 |
| 6,004,421 A | * | 12/1999 | Landa | 156/258 |
| 6,120,200 A | * | 9/2000 | Watanabe et al. | 400/615.2 |
| 6,134,016 A | * | 10/2000 | Watanabe et al. | 358/1.1 |
| 6,507,411 B1 | * | 1/2003 | Nishikawa et al. | 358/1.2 |
| 6,575,554 B2 | * | 6/2003 | Yoshinaga | 347/22 |
| 6,591,076 B2 | * | 7/2003 | Connors | 399/194 |
| 2002/0069228 A1 | * | 6/2002 | Mori et al. | 707/524 |
| 2003/0053083 A1 | | 3/2003 | Nishikawa et al. | 348/1.2 |
| 2003/0202211 A1 | * | 10/2003 | Yudasaka et al. | 358/1.18 |

FOREIGN PATENT DOCUMENTS

| | | | | |
|---|---|---|---|---|
| JP | 2000-25277 A | 2/2000 | | B41J/5/30 |
| JP | 2002-187261 A | 7/2002 | | B41J/2/01 |

OTHER PUBLICATIONS

Microsoft Computer Dictionary, 1994, Microsoft Press, Second Edition, p. 56.*

* cited by examiner

Primary Examiner—Andrew H. Hirshfeld
Assistant Examiner—Wasseem H. Hamdan
(74) Attorney, Agent, or Firm—Fitzpatrick, Cella, Harper & Scinto

(57) ABSTRACT

It is an object of the present invention to enable no-margin printing to be achieved without the need to cut off margins, while avoiding a discontinuous output result in which the areas between adjacent print images are missing even if poster printing is carried out. Print data outputted by an input section is stored in an input buffer. One page of print data from the input buffer is inputted to the dividing section. The dividing section divides the one page of print data in accordance with division numbers J and K indicated by an instructing section. The dividing section then outputs the divided print data to a printing section as a plurality of print images. The plurality of print images outputted to the printing section are printed on the respective sheets.

21 Claims, 14 Drawing Sheets

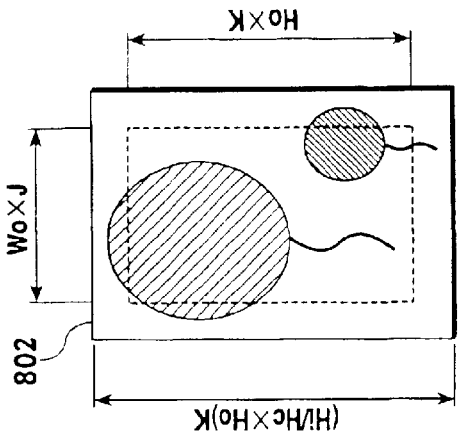
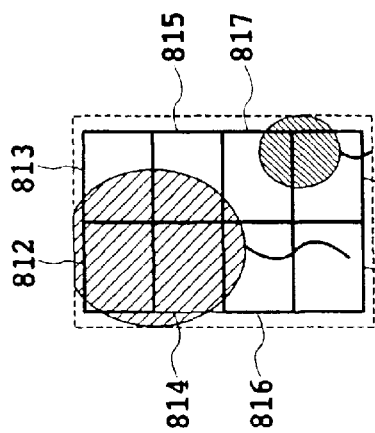
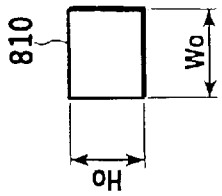
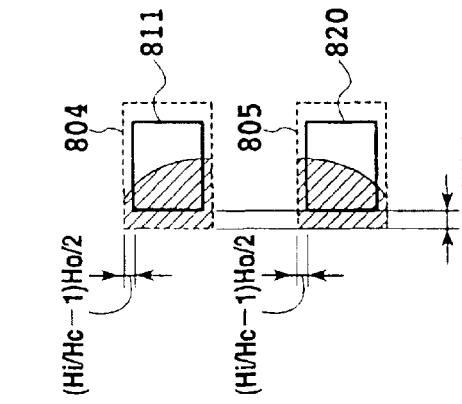
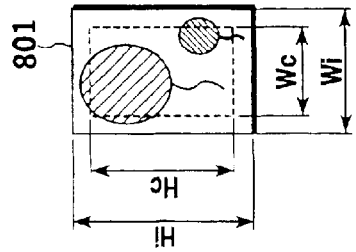
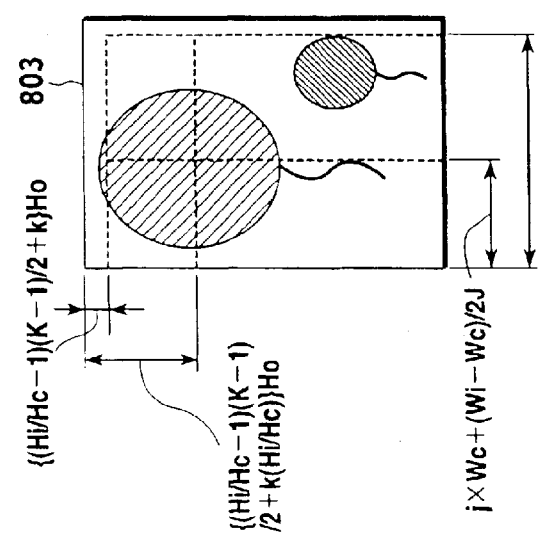

PRINTING APPARATUS AND METHOD FOR NO-MARGIN PRINTING

This application claims priority from Japanese Patent Application Nos. 2002-208886 filed Jul. 17, 2002 and 2003-185875 filed Jun. 27, 2003, which are incorporated hereinto by reference.

BACKGROUND OF THE INVENTION

1. Field of the Invention

The present invention relates to a printing apparatus and method, and more specifically, to a printing apparatus and method for carrying out printing without any margins by inputting a print image having an area larger than the area of a sheet.

2. Description of the Related Art

In addition to systems that take a photograph using a silverprint film and then print the photograph, systems have been used which use a printer to print image data obtained using a digital camera.

FIG. 1 shows a print system that connects a host computer and a printing apparatus together via an interface. In a printing system composed of a host computer 1302 and a printer 1303, various data editions are carried out on the basis of various application programs activated on the host computer 1302. The edited data is outputted to a printer 1303 connected to the host computer 1302 via an interface 1301 (Ethernet (registered trade mark), USB, IEEE1394, or the like), as print data for printing. In this printing system, if the printer 1303 performs an operation of printing print data, a printer driver activated on the host computer 1302 displays dialogs or the like before the application program outputs data so that a user can set print instruction parameters such as the size of a sheet to be printed.

Further, in a printing system composed of a digital camera in place of the host computer, image data obtained by the digital camera is outputted to a printer connected to the digital camera via an interface, as print data for printing. In a printing system composed of a storage medium connected to a printer, image data stored in a storage medium is outputted to the printer as print data for printing. In these printing systems, the user can set the print instruction parameters such as the size of a sheet to be printed, from an operation section of the digital camera or printer.

In general, there is a tendency toward silverprint photographs printed without any margins. Thus, printers are known which can print a photograph without any margins (this printing will hereinafter be referred to as "no-margin printing") in order to pint an image like a silverprint photograph. Such a printer outputs a print image of a size Wi×Hi, which is slightly larger than the effective area Wc×Hc of paper for output as shown in FIG. 2. Thus, the output sticks out of the paper to some extent to achieve no-margin printing. Some printers output the sticking-out part to an area in which the paper is not present. Other printers cut off and remove the sticking-out part of the paper from the remaining part. For example, see Japanese Patent Application Laid-open No. 2002-187261.

On the other hand, there are printers or print systems which can print, in order to obtain an output result larger than sheets that can be printed by themselves, one page of print data on a plurality of sheets and join them together to obtain a larger output result (this printing will hereinafter be referred to as "poster printing"). For example, see Japanese Patent Application Laid-open No. 2000-25277. For example, the print image of size Wi×Hi as shown in FIG. 2 is printed on a plurality of sheets 901 to 908 as shown in FIG. 3.

However, if poster printing is carried out without no-margin printing, margins are present in each sheet as shown in FIG. 3. Accordingly, in order to join the sheets together to obtain a larger output result, these margins must be cut off.

Further, if poster printing is carried out using a printer that can execute no-margin printing, some parts of the output stick out of the effective area of sheets. When output data 601 is simply divided and printed on a plurality of sheets 701 to 708 as shown in FIG. 4, some areas of the data are missing even after the sheets have been joined together as shown in FIG. 5. Therefore, the output result is disadvantageously discontinuous.

SUMMARY OF THE INVENTION

It is an object of the present invention to provide a printing apparatus and method that enables no-margin printing to be achieved without the need to cut off margins, while avoiding a discontinuous output result in which the areas between adjacent print images are missing even if poster printing is carried out.

To attain this object, a printing apparatus comprises printing means to which a print image having an area larger than the area of a sheet is inputted to carry out no-margin printing, and output means for dividing, on the basis of an instruction to divide one page of data into a plurality of pieces and output these pieces on respective pages, a print image corresponding to a sheet to be printed so that each piece of the print image corresponding to a piece of the sheet partly overlaps another piece of the print image corresponding to an adjacent piece of the sheet, and then outputting these pieces of the print images.

The data may be divided so that the pieces of the print image corresponding to the adjacent pieces of the sheet overlap a part of the outside or inside of the sheet to be printed. Alternatively, affine transformation may be executed before the division.

The number of pieces into which the indicated one page of print data is divided is inputted using positive integers for an x and y directions. The division numbers can be calculated for the x and y directions, respectively, on the basis of an inputted value and the sizes of the sheet in the x and y directions, respectively.

The printing means can carry out printing using an outputted print image in which at least one side of the sheet has an arbitrary size. The print image can also be outputted by indicating one side of the sheet to the printing means on the basis of the division numbers inputted using the positive integers for the x and y directions, respectively.

The above and other objects, effects, features and advantages of the present invention will become more apparent from the following description of embodiments thereof taken in conjunction with the accompanying drawings.

BRIEF DESCRIPTION OF THE DRAWINGS

FIGS. 9A to 9F are views showing a dividing process in the enlarging and contracting process;

DETAILED DESCRIPTION OF PREFERRED EMBODIMENTS

Embodiments of the present invention will be described below with reference to the drawings.

Figure 6:
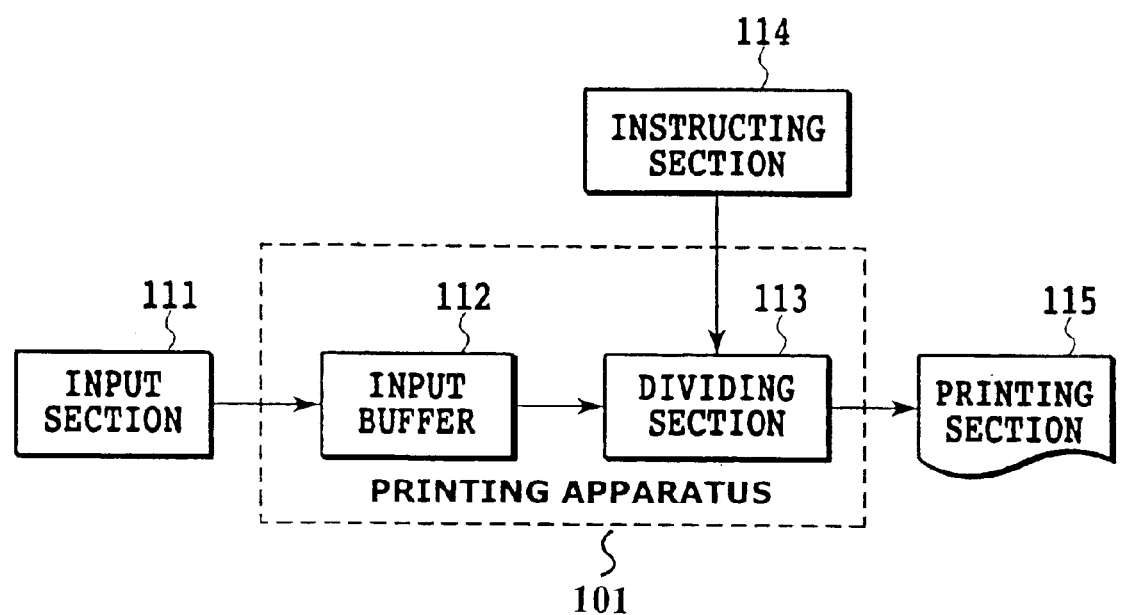
FIG. 6 is a block diagram showing a printing apparatus according to a first embodiment of the present invention.

FIG. 6 shows a printing apparatus according to a first embodiment of the present invention. A printing apparatus 101 is composed of an input buffer 112 and a dividing section 113. An input section 111, an instructing section 114, and a printing section 115 are connected to the printing apparatus 101.

With this arrangement, print data outputted by the input section 111 is stored in the input buffer 112. One page of print data from the input buffer is inputted to the dividing section 113. The dividing section 113 then divides the one page of print data in accordance with the division numbers J and K indicated by the instructing section 114. The dividing section 113 then outputs the pieces obtained by the division to the printing section 115 as a plurality of print images.

Here, the division numbers J and K are each a positive integer indicative of the number of pieces into which print data is divided in an x or y direction of the print data. The plurality of print images outputted to the printing section 115 are printed on the respective sheets.

Figure 7:
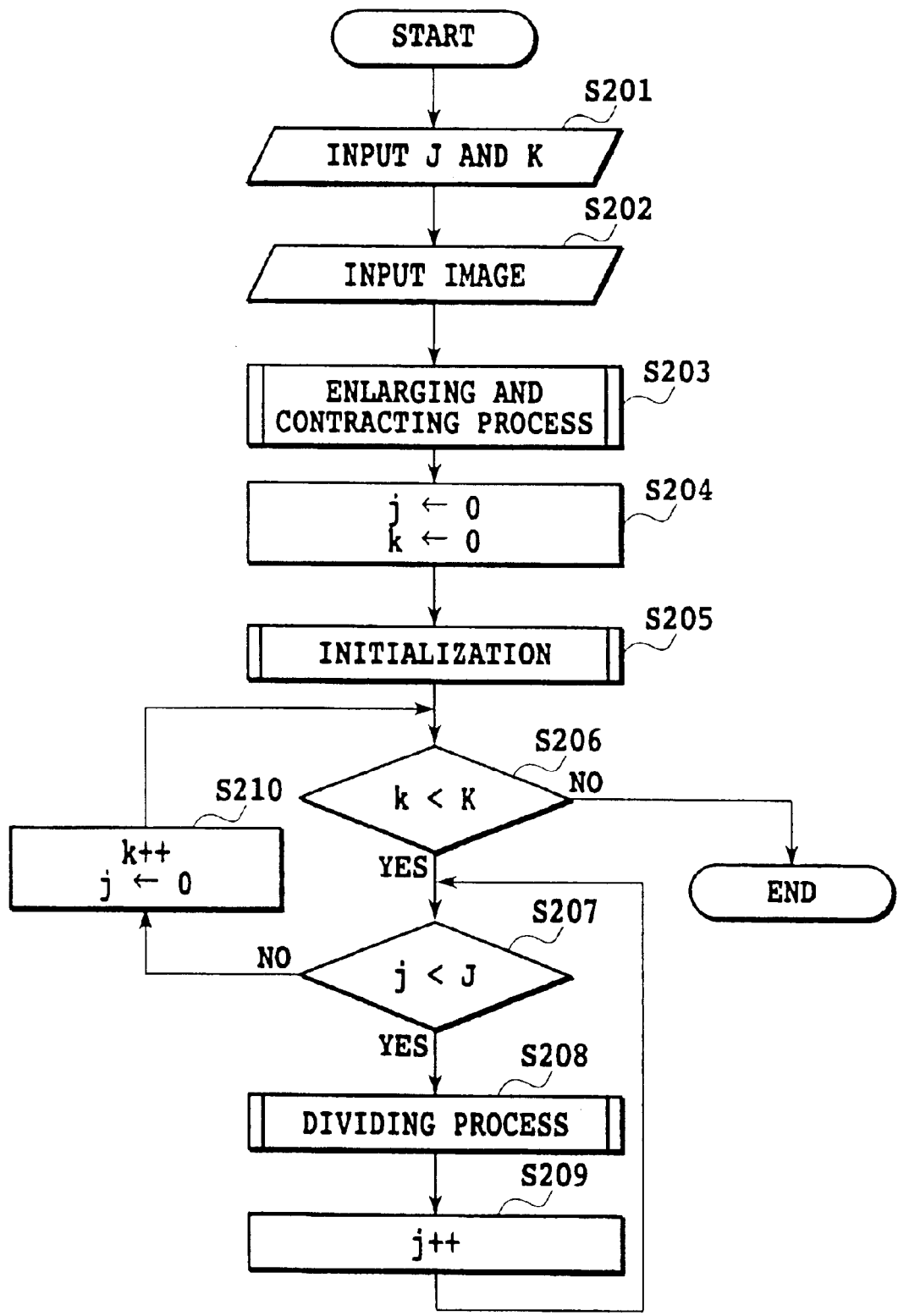
FIG. 7 is a flow chart showing operation of a dividing section in FIG. 6.

FIG. 7 is a flow chart of operations of the dividing section in FIG. 6. At step S201, the instructing section 114 inputs the numbers J and K indicating the number of sheets on which the respective images are printed. At step S202, one page of print data from the input buffer 112 is inputted to the dividing section 113. At step S203, the inputted print data is subjected to an enlarging and contracting process.

At step S204, counters j and k are initialized to zeros. At step S205, initialization is executed for a dividing process. At step S206, if k<K, the procedure proceeds to step S207. Then at step S207, if j<J, a dividing process is executed at step S208. Subsequently, at step S209, j is incremented. Then the procedure returns to step S207.

At step S207, if j is not smaller than J, then at step S210, k is incremented and j is initialized to zero. The procedure then returns to step S206. If k is not smaller than K at step S206, the process is ended.

Operations of the dividing section 113 correspond to subjecting one page of the print data inputted by the input buffer 112, to affine transformation, i.e. synthesis of linear transformation and parallel movement, and then outputting a rectangular area contained in the transformed print data to the printing section 115.

Figure 8:
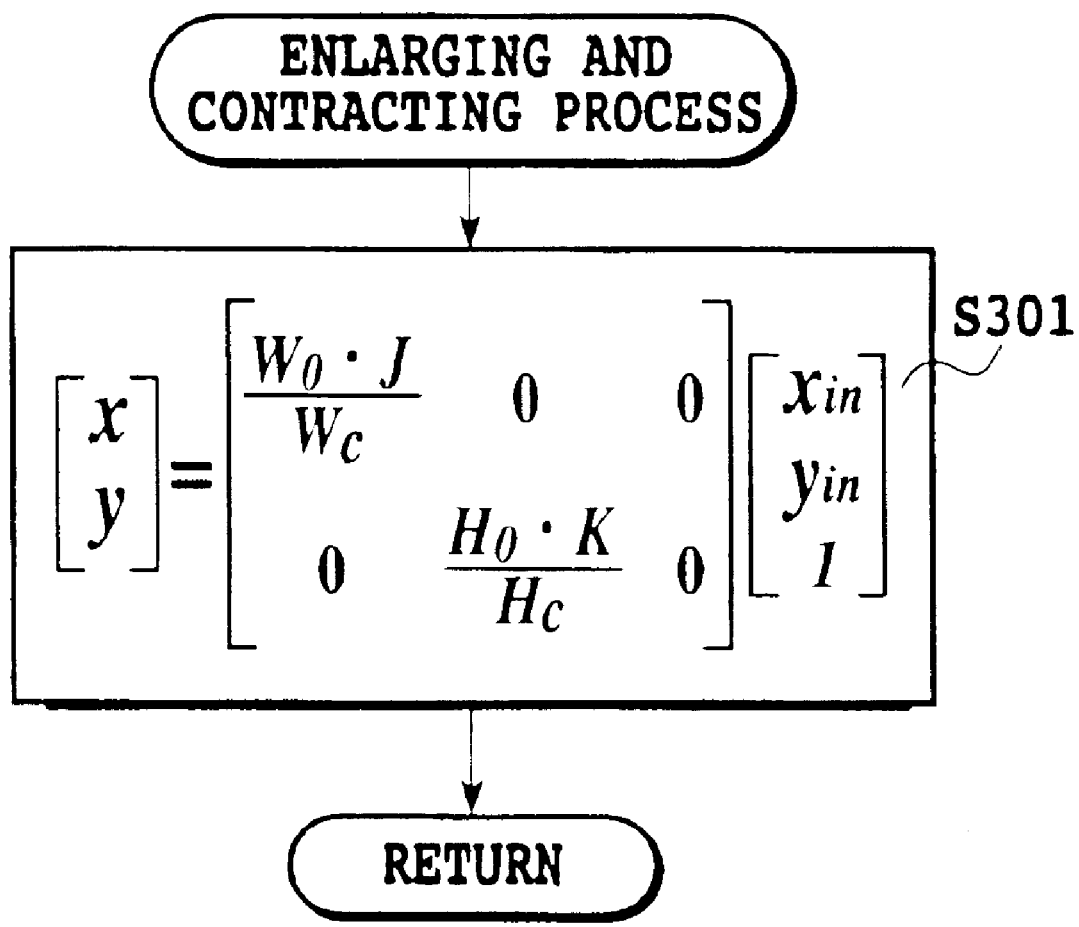
FIG. 8 is a flow chart showing the contents of an enlarging and contracting process at step S203 in FIG. 7.

FIG. 8 shows the contents of the enlarging and contracting process at step S203 in FIG. 7. At step S202, one page of print data 801 from the input buffer 112, which data is shown in FIG. 9A, is enlarged or contracted to become transformed print data 802, shown in FIG. 9C. The enlarging and contracting process is executed using the transformation matrix shown at step S301, on the basis of the size of a sheet 810 to which the data is to be outputted, the sheet being shown in FIG. 9B. [xin,yin] are coordinates of the print data 801 before the enlarging and contracting process. [x,y] are coordinates of the transformed print data 802 after the enlarging and contracting process.

Here, Wi and Hi denote the sizes of the inputted print data 801 in the x and y directions, respectively. Wc and Hc denote the sizes of print data printed in an effective area in the sheet in the x and y directions, respectively. Wo and Ho denote the sizes of the sheet 810 to which the print data is to be printed in the x and y directions, respectively. The transformation matrix increases the size of the print data in the x direction by a factor of (Wo/Wc)·J, while increasing the size of the print data in the y direction by a factor of (Ho/Hc)·K.

Figure 10:
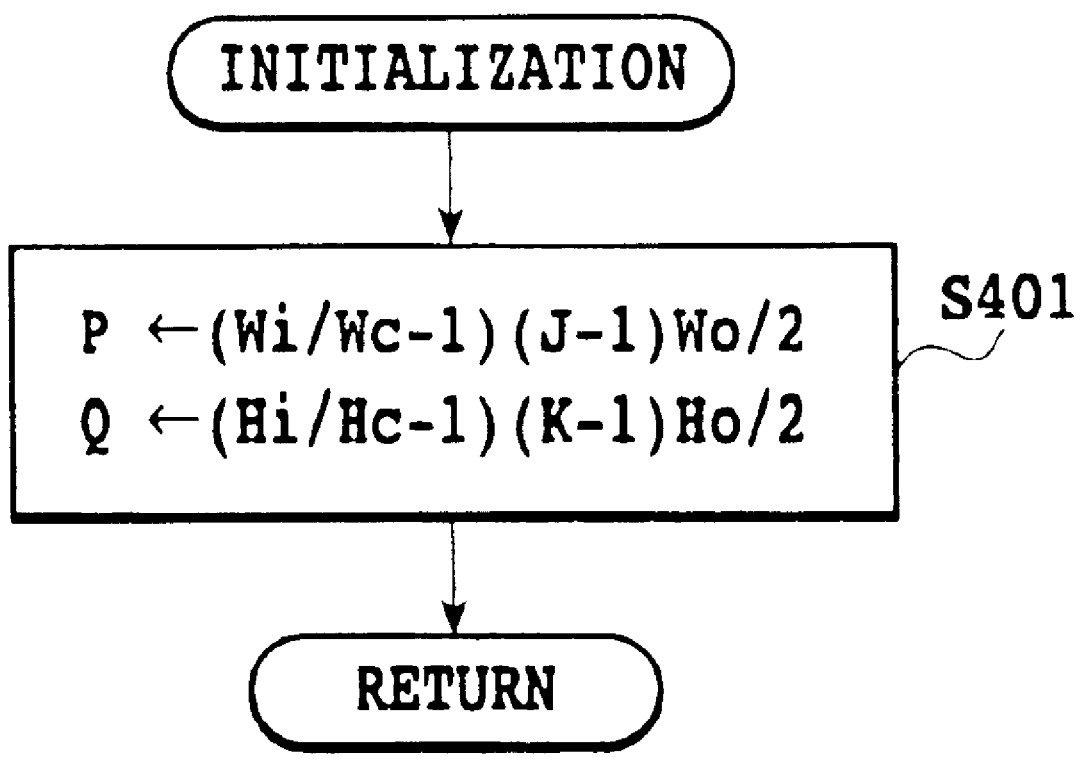
FIG. 10 is a flow chart showing the contents of dividing process initialization at step S205 in FIG. 7.

FIG. 10 shows the contents of the dividing process initialization at step 205 in FIG. 7. At step S401, constants P and Q used to represent areas in the print data outputted to the respective sheets are initialized as P←(Wi/Wc−1)(J−1)Wo/2 and Q←(Hi/Hc−1)(K−1)Ho/2.

Figure 11:
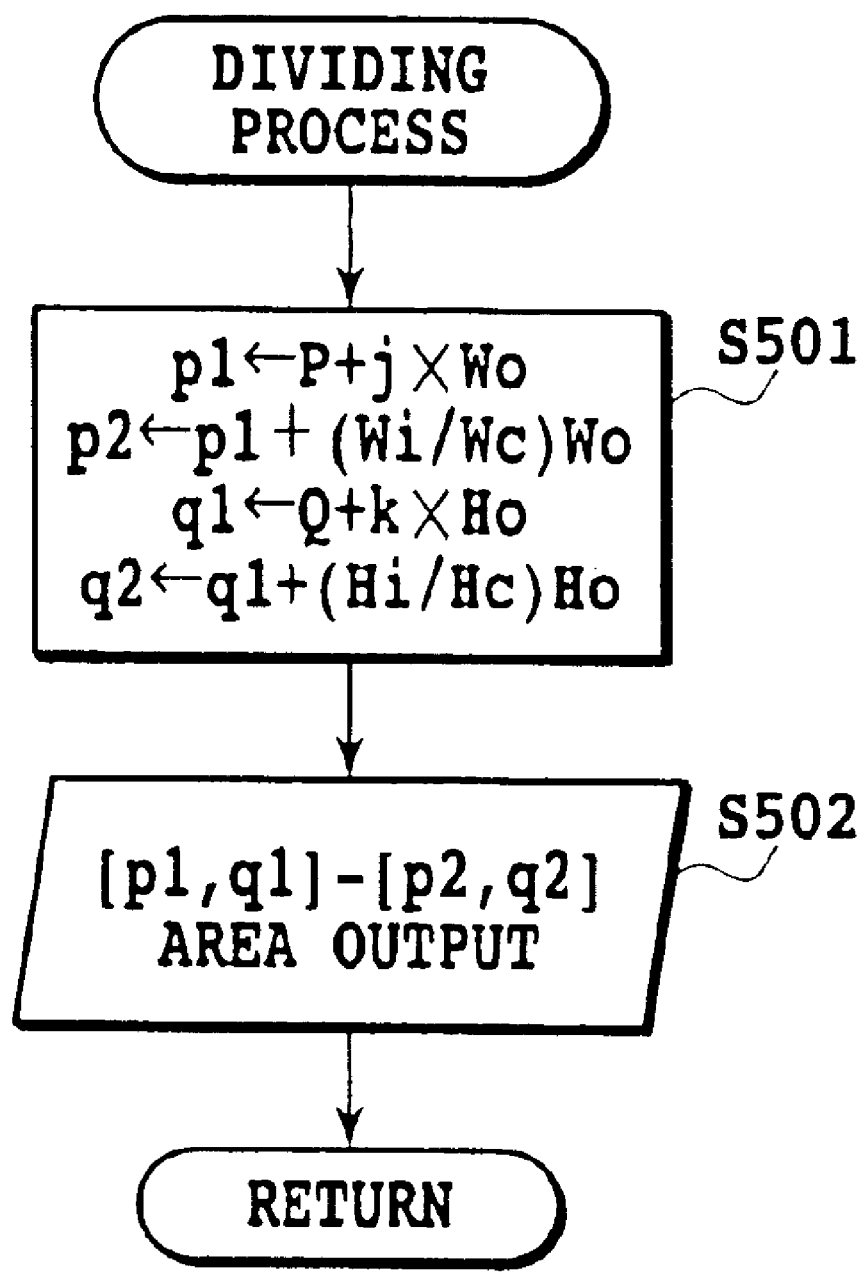
FIG. 11 is a flow chart showing the contents of the dividing process at step S208 in FIG. 7.

FIG. 11 shows the contents of the dividing process at step S208 in FIG. 7. At step S501, p1 and p2 denote coordinates in the x direction of the data 803, and q1 and q2 denote coordinates in the y direction of the data 803, as shown in FIG. 9D. The following substitutions are possible: p1←P+j×Wo, p2←p1+(Wi/Wc)Wo, q1←Q+k×Ho, and q2←q1+(Hi/Hc)Ho.

Then at step S502, rectangular areas from the data 803 each of which has points [p1, q1 ] and [p2, q2] as diagonal lines are outputted to the printing section 115. Thus, as shown in FIG. 9E, the rectangular area 804 is outputted to the sheet 811 to be printed, and the rectangular area 805 is outputted to the sheet 820 to be printed. In this dividing process, each of the plurality of rectangular areas obtained by the division overlaps its adjacent rectangular area by the distance (Wi/Wc−1)Wo in the x direction and by the distance (Hi/Hc−1)Ho in the y direction. For example, that part of the rectangular area 804 which corresponds to the distance (Hi/Hc−1)Ho from its lower end is also outputted at the upper end of a rectangular area 805.

This is because those parts of the rectangular area 804 which correspond to the distance (Wi/Wc−1)Wo/2 from the respective ends in the x direction and to the distance (Hi/Hc−1)Ho/2 from the respective ends in the y direction are outputted to the outside of the effective area of the sheet and are not contained in the output result. If, for example, J=2 and K=4, such a dividing process enables no-margin printing to be achieved over eight sheets 812 to 819 as shown in FIG. 9F, while avoiding a discontinuous output result in which the areas between adjacent print images are missing.

The first embodiment is particularly effective if the printer can carry out mechanically accurate no-margin printing. The first embodiment does not require margins of paper left for applying paste but enables poster printing to be accomplished by arranging sheets without any gaps rather than pasting each sheet to its adjacent one.

Now, description will be given of a second embodiment of the present invention. The second embodiment differs from the above described first embodiment in the contents of inputted instructions from the instructing section 114 and in the contents of a dividing process executed by the dividing section 113.

The instructing section 114 shown in FIG. 6 inputs only the number J of sheets on which the respective images are to be printed. In this case, J denotes a positive integral representing the number of pieces into which the print data is divided in the x direction. J·Ho·Wc/(Hc·Wo) is substituted for the number K of pieces into which the print data is divided in the y direction. This enables poster printing with the ratio of the size of the print data 801 in the x direction to its size in the y direction maintained at Hi to Wi.

However, if the value of K is not a positive integer, if K−1=k<K in the flow chart shown in FIG. 7, then for the rectangular area outputted to the printing section 115 at step S208, no-margin printing may not be achieved on one side of the sheet but a space may be contained within the effective area.

Now, description will be given of a third embodiment of the present invention. The printing section 115 in the third embodiment is different from the one of the printing apparatus in the above described first embodiment.

The printing section 115 shown in FIG. 6 is a device that prints a sheet on a roll. The printing section 115 allows the size Ho of a sheet in the y direction to be arbitrarily set. The instructing section 114 inputs the numbers J and K indicating the number of sheets on which the respective images are to be printed. Here, the numbers J and K are each a positive integer indicative of the number of pieces into which print data is divided in the x or y direction. The dividing section 113 sets the size Ho of the sheet in the y direction in the printing section 115 as Hc·Wo·J/(Wc·K).

This enables poster printing with the ratio of the size of the print data 801 in the x direction to its size in the y direction maintained at Hi to Wi.

Now, description will be given of a fourth embodiment of the present invention. The fourth embodiment differs from the above described first embodiment in the operation of the dividing section 113 of the printing apparatus.

Figure 12:
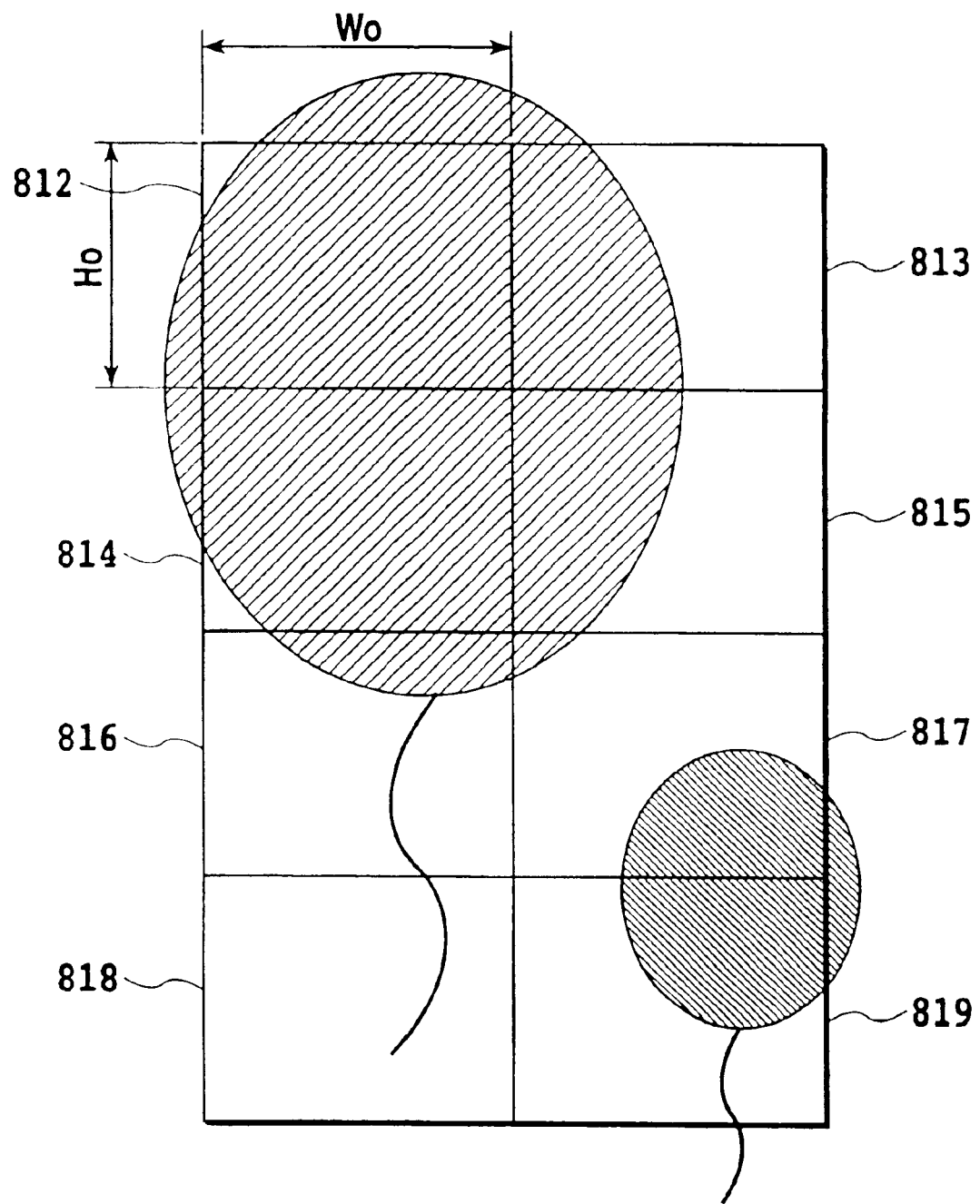
FIG. 12 is a view showing the result of poster printing without any margins carried out by the printing apparatus according to the first embodiment of the present invention.
Figure 13:
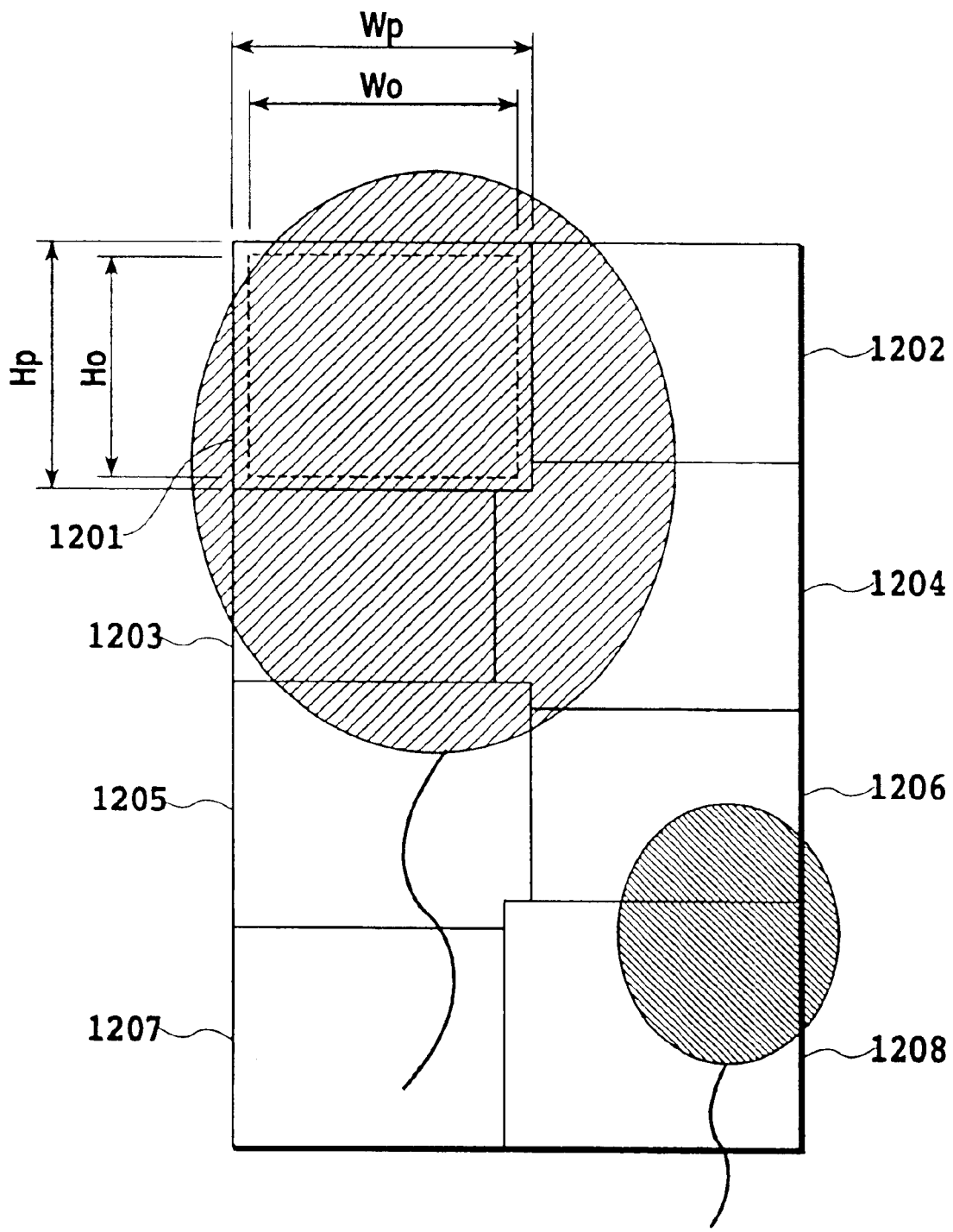
FIG. 13 is a view showing the result of poster printing without any margins carried out by a printing apparatus according to a fourth embodiment of the present invention.

The output result from the printing apparatus in the first embodiment is such that when the sheets 812 to 819 are joined together, the original images are properly connected together via the ends of the sheets as shown in FIG. 12. The output result from the printing apparatus in the forth embodiment is such that when the sheets 1201 to 1208 are overlapped together, the original images are properly connected together via the ends of the sheets as shown in FIG. 13. In FIG. 12, the sheets 812 to 819 of the same size Wo×Ho are arranged in both x and y directions without any overlapping parts. In FIG. 13, sheets of the same size Wp×Hp are arranged in the order of 1202, 1203, 1206, 1207, 1204, 1205, 1208, and 1201 in a direction approaching the reader so that their ends overlap one another.

The dividing section 113 shown in FIG. 6 uses as virtual sheet sizes the sizes Wo and Ho of a sheet in the x and y directions, respectively, which are used in the process shown in FIGS. 8, 10, and 11. The dividing section 113 sets the sizes Wo and Ho to be smaller than the sizes Wp and Hp of a sheet in the x and y direction, respectively, which are actually used in printing. The ranges of the values of Wp and Hp are Wi/Wc=Wp/Wo=1 and Hi/Hc=Hp/Ho=1.

Figure 14B:
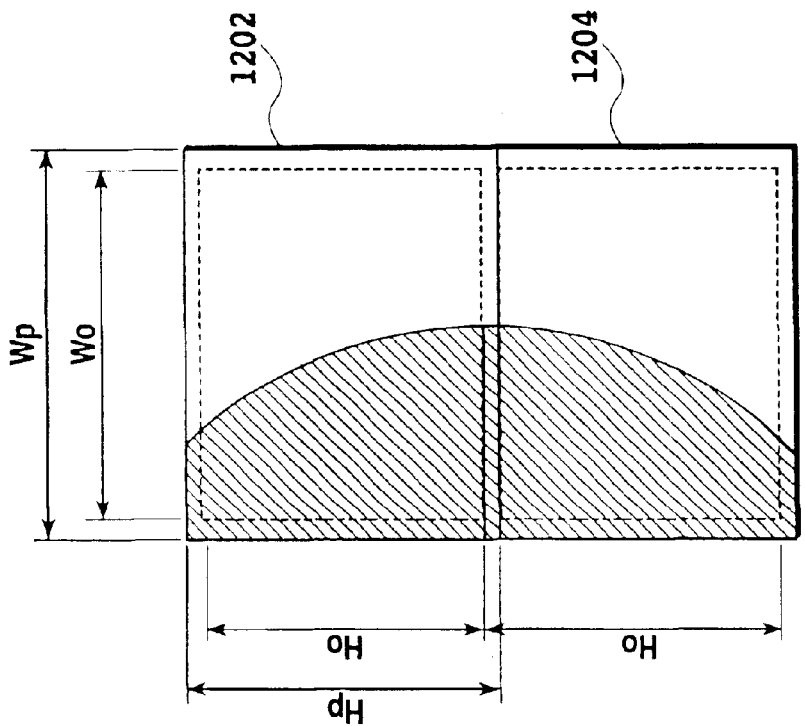
FIGS. 14A and 14B is a view showing the result of poster printing without any margins followed by joining together of printed pieces according to the fourth embodiment.
Figure 14A:
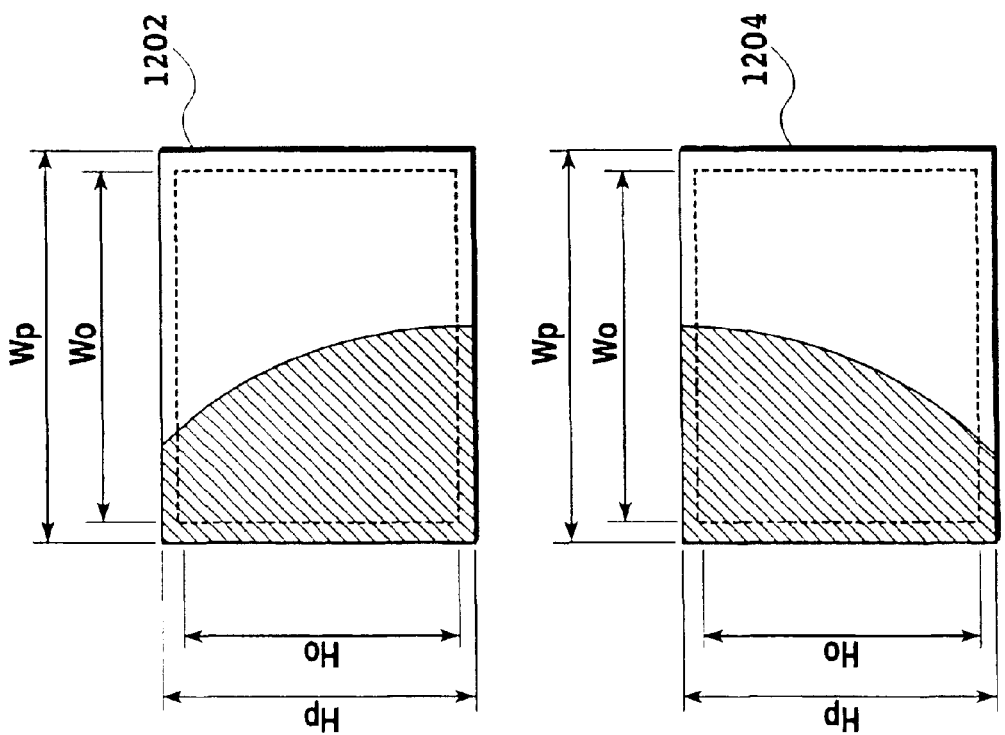

For example, as shown in FIG. 14A, that part of the sheet 1202 which corresponds to the distance (Hp-Ho) from its lower end is also outputted at the upper end of the sheet 1204. By laying the sheet 1202 on top of the sheet 1204 so that the above part overlaps the upper end of the sheet 1204 as shown in FIG. 14B, the output is such that the original images are properly connected together.

Thus, when no-margin printing is carried out and if any area outside the effective area of the sheet is printed owing to the mechanical accuracy of the printing section or the like, all the original image areas can be outputted by laying the end of each sheet on top of the end of the corresponding sheet.

Now, description will be given of a fifth embodiment of the present invention. The fifth embodiment differs from the above described first embodiment in that a print image is divided by a host computer connected to the printing apparatus.

Figure 1:
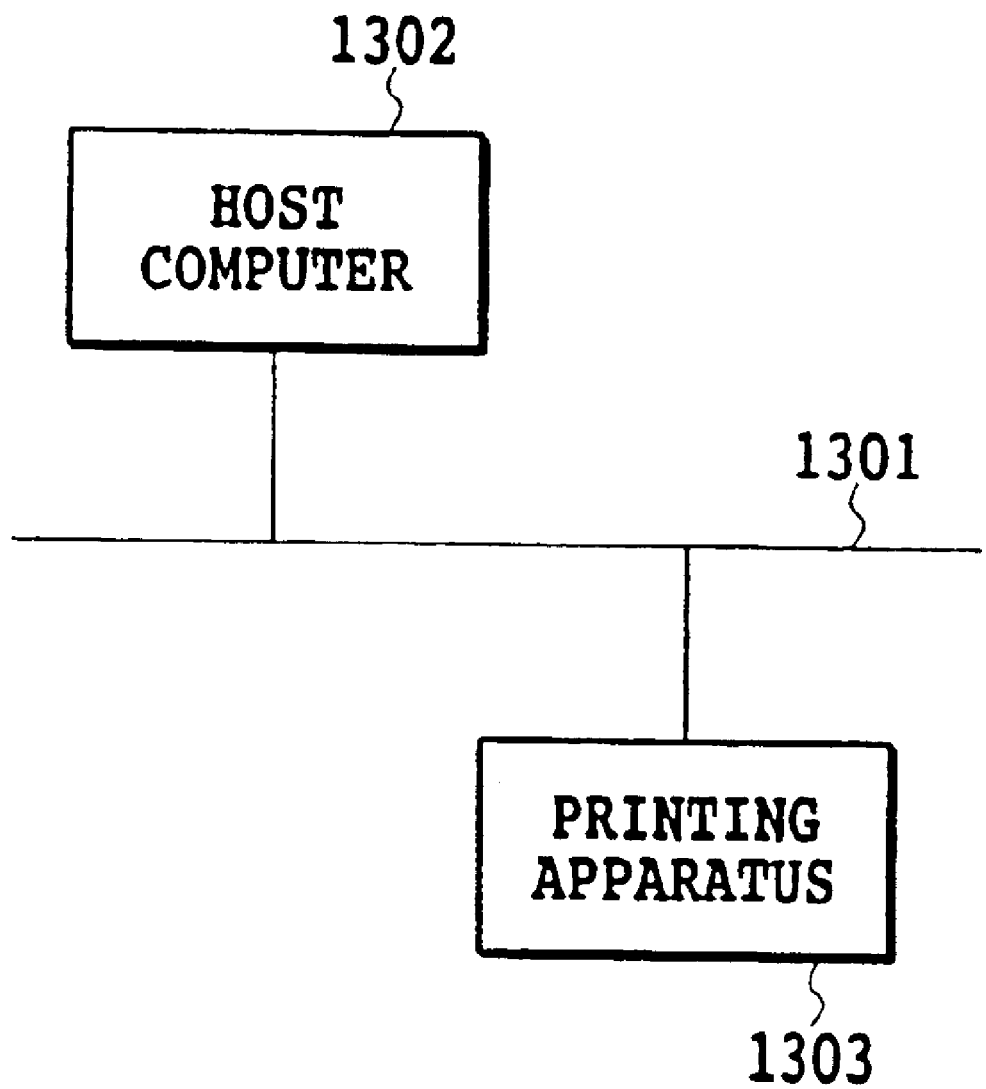
FIG. 1 is a diagram showing a conventional printing system in which a host computer and a printing apparatus are connected together using an interface.
Figure 2:
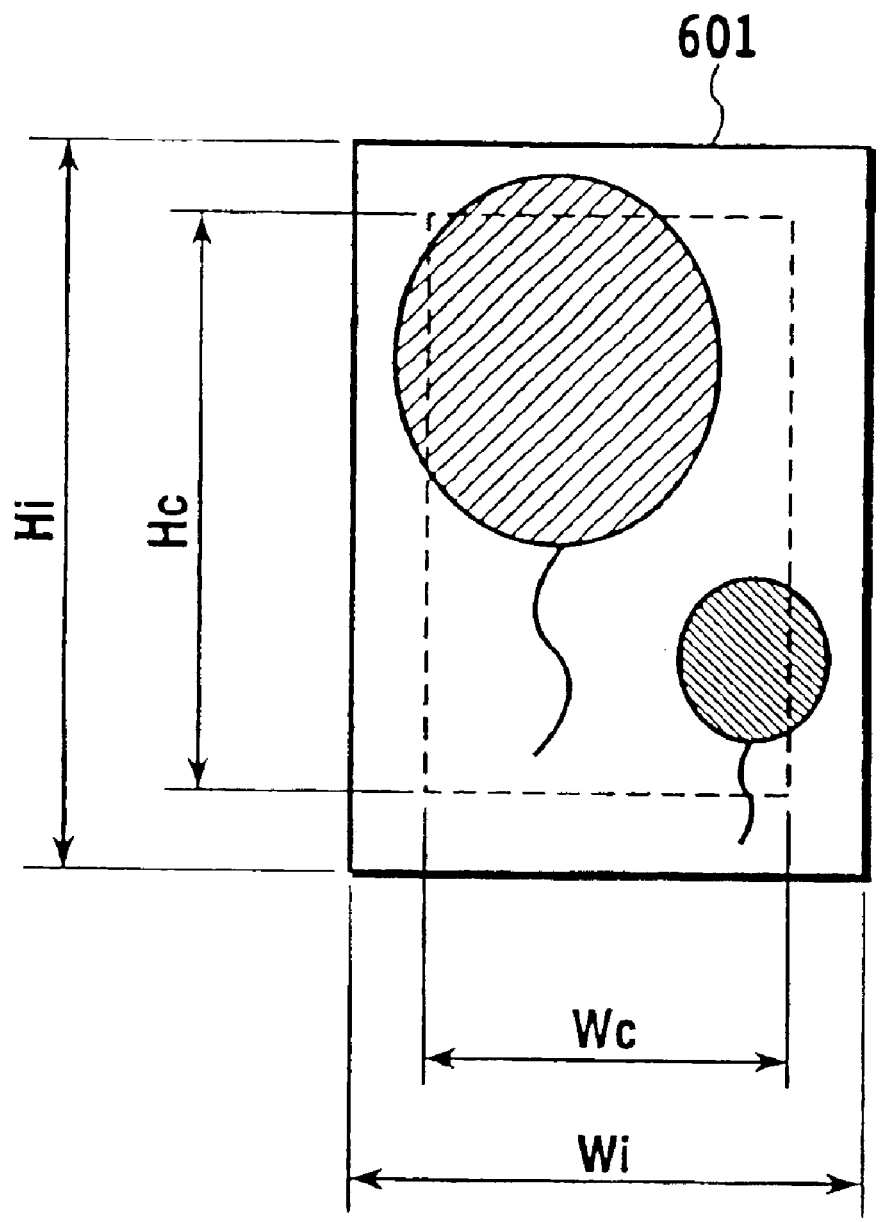
FIG. 2 is a view showing inputted print data.
Figure 3:
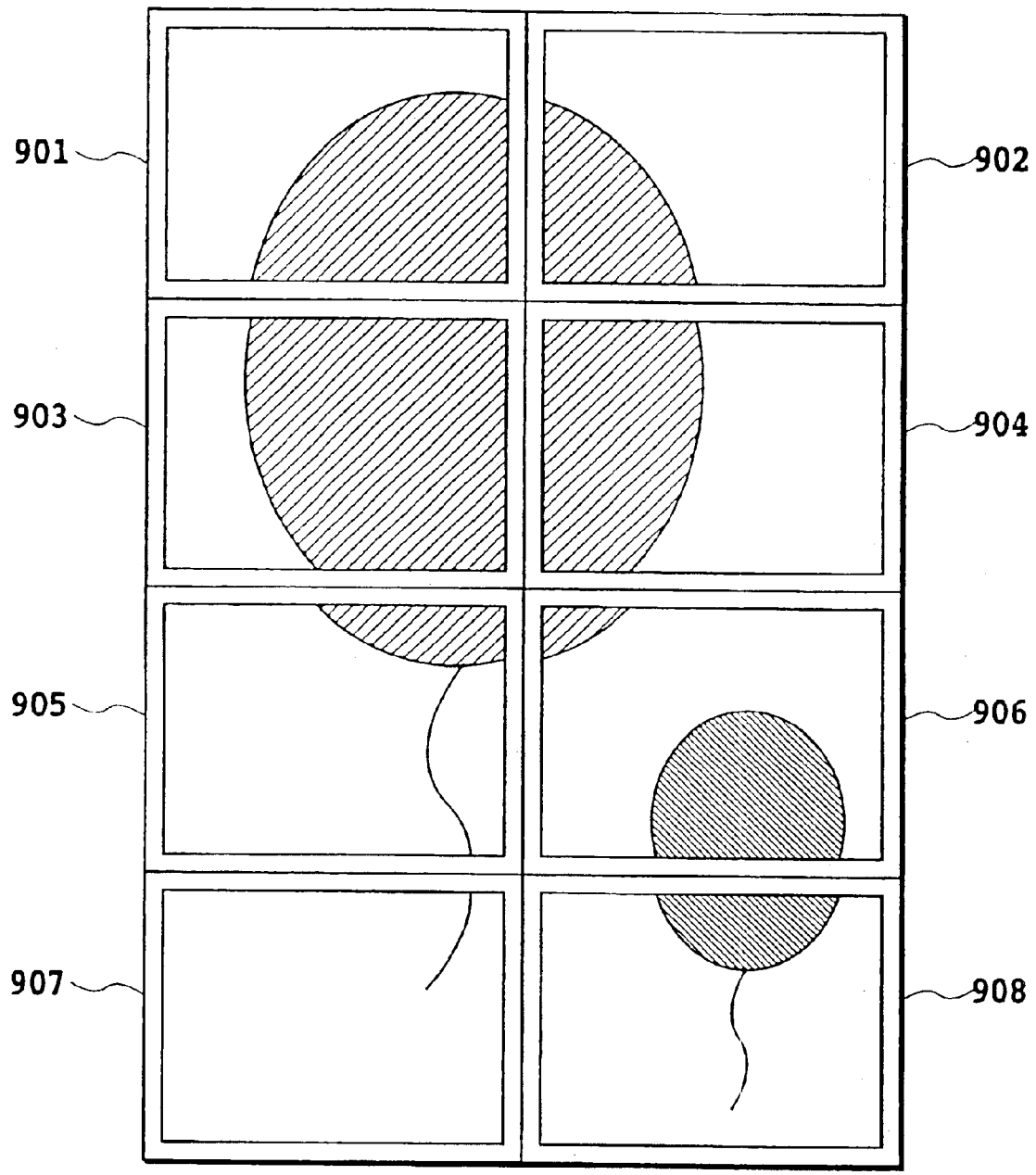
FIG. 3 is a view showing the result of conventional poster printing with margins.
Figure 4:
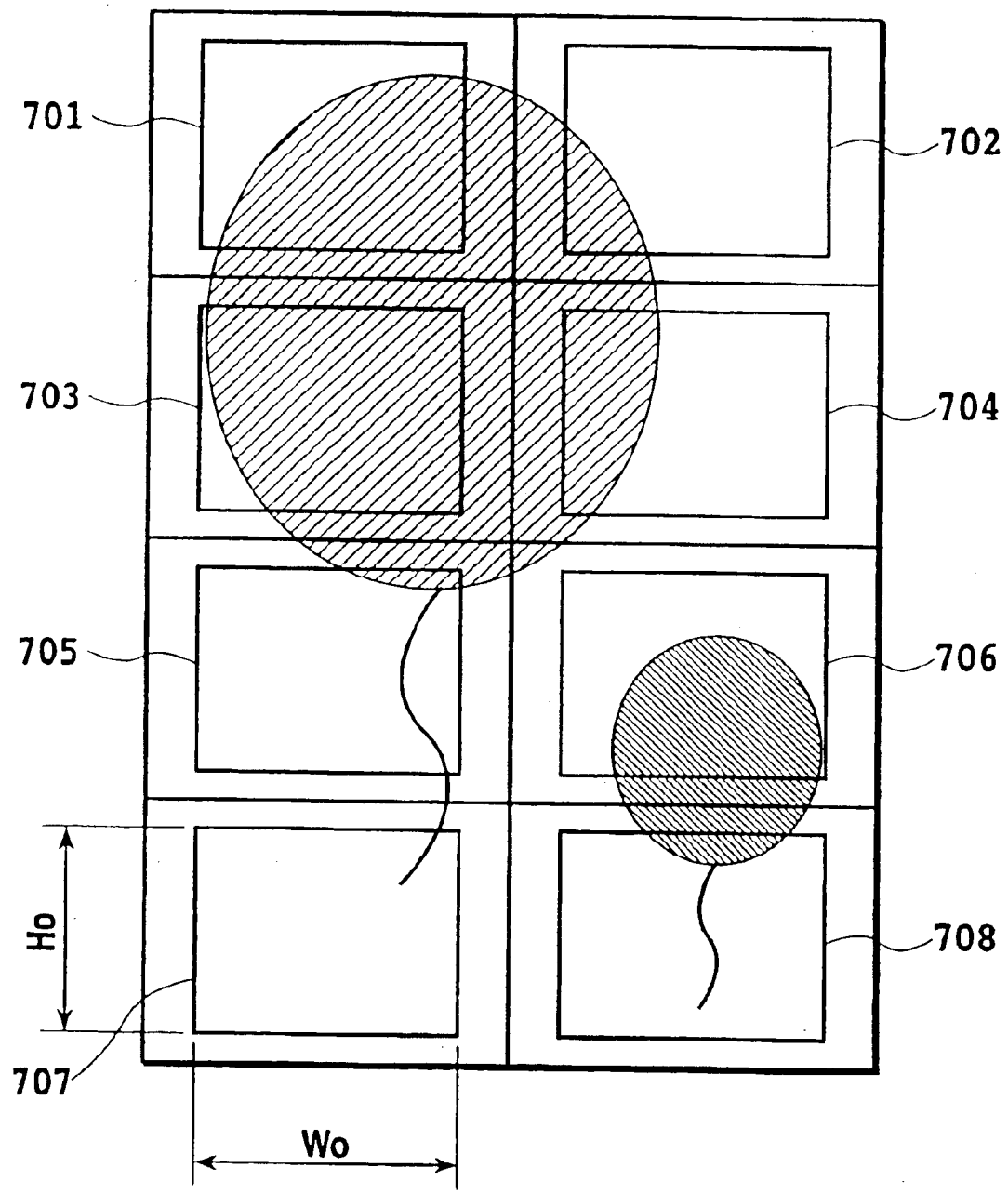
FIG. 4 is a view showing the result of conventional poster printing without any margins.
Figure 5:
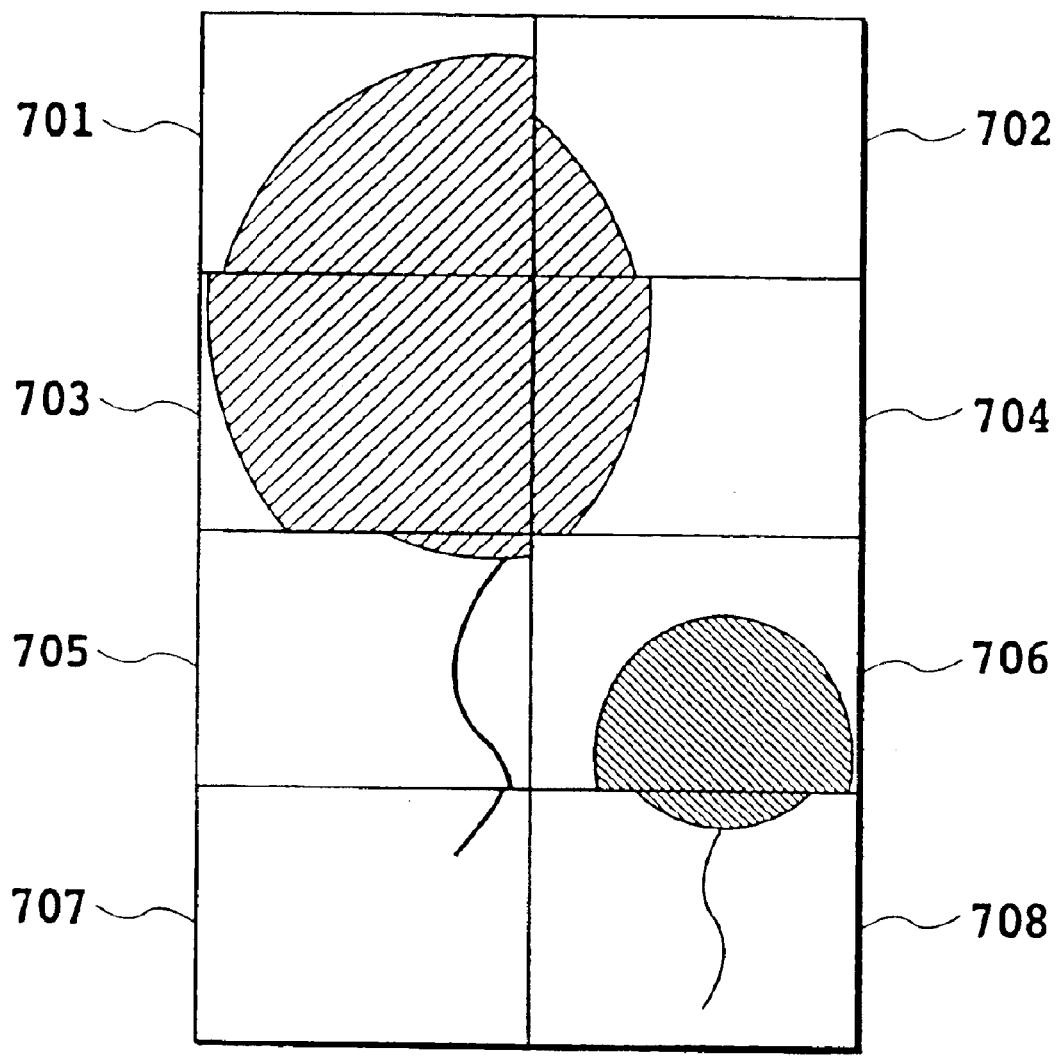
FIG. 5 is a view showing the result of conventional poster printing without any margins followed by joining together of printed pieces.

A printer driver activated by a host computer 1302, shown in FIG. 1, displays a dialog to prompt the user to input the division numbers J and K as print instruction parameters. The process shown in FIGS. 7, 8, 10, and 11 is executed on image data edited by an application program. In this manner, as shown in FIG. 9F, print data is divided into pieces corresponding to the sheets 812 to 819 to which the data is to be outputted, and is then outputted to a printing apparatus 1303 via an interface 1301. The dividing process can be executed by the application program in place of the printer driver. In this case, the application program can output print data to the printing apparatus without using the printer driver.

Even with a system that cannot buffer, in the printing apparatus, a print image for one sheet transmitted by the host computer, a poster printing function can be used to carry out no-margin printing while avoiding a discontinuous output result in which the areas between adjacent print images are missing.

The present invention has been described in detail with respect to preferred embodiments, and it will now be apparent from the foregoing to those skilled in the art that changes and modifications maybe made without departing from the invention in its broader aspect, and it is the intention, therefore, in the apparent claims to cover all such changes and modifications as fall within the true spirit of the invention.

What is claimed is:

1. A printing apparatus comprising:
    printing means to which as print image is inputted to carry out no-margin printing according to the inputted print image, the print image having an image beyond the boundary of a sheet to be printed; and
    output means for dividing, on the basis of an instruction to divide one page of data into a plurality of pieces and outputting these pieces on respective pages, a print image corresponding to the sheet to be printed such that each piece of the print image corresponding to a piece of the sheet partly overlaps another piece of the print image corresponding to an adjacent piece of the sheet, and then outputting these pieces of the print image to said printing means.

2. A printing apparatus according to claim 1, wherein said output means divides the print image so that the pieces of the print image corresponding to the adjacent pieces of the sheet overlaps a part of the outside of the sheet to be printed, and outputs these pieces of the print image to said printing means.

3. A printing apparatus according to claim 1 or 2, wherein said output means divides the print image so that the pieces of the print image corresponding to the adjacent pieces of the sheet overlaps a part of the inside of the sheet to be printed, and outputs these pieces of the print image to said printing means.

4. A printing apparatus according to claim 1, wherein said output means subjects one page of print data inputted from input buffering means to affine transformation, divides the transformed print data, and then outputs the divided print data.

5. A printing apparatus according to claim 1, wherein the number of pieces into which the indicated one page of print data is divided is inputted using positive integers for x and y directions of the sheet.

6. A printing apparatus according to claim 5, wherein division numbers are calculated for the x and y directions, respectively, on the basis of an inputted value and the sizes of the sheet in the x and y directions, respectively.

7. A printing apparatus according to claim 6, wherein said printing means can carry out printing using an outputted print image in which at least one side of the sheet has an arbitrary size, and the print image is outputted by indicating one side of the sheet to the printing means on the basis of the division numbers inputted using the positive integers for the x and y directions, respectively.

8. A printing method utilizing a printing section to which a print image is inputted to carry out no-margin printing according to the inputted print image, the print image having an image beyond the boundary of a sheet to be printed, said method comprising the steps of:

dividing, on the basis of an instruction to divide one page of data into a plurality of pieces and to output these pieces on respective pages, a print image corresponding to the sheet to be printed such that each piece of the print image corresponding to a piece of the sheet partly overlaps another piece of the print image corresponding to an adjacent piece of the sheet; and outputting these pieces of the print image to the printing section.

9. A printing method according to claim 8, wherein said dividing step includes dividing the print image such that the pieces of the print image corresponding to the adjacent pieces of the sheet overlaps a part of the outside of the sheet to be printed.

10. A printing method according to claim 8 or 9, wherein said dividing step includes dividing the print image such that the pieces of the print image corresponding to the adjacent pieces of the sheet overlaps a part of the inside of the sheet to be printed.

11. A printing method according to claim 8, wherein said outputting step includes subjecting one page of print data inputted from an input buffering section to affine transformation, dividing the transformed print data, and then outputting the divided print data.

12. A printing method according to claim 8, wherein the number of pieces into which the indicated one page of print data is divided is inputted using positive integers for x and y directions of the sheet.

13. A printing method according to claim 12, wherein division numbers are calculated for the x and y directions, respectively, on the basis of an inputted value and the sizes of the sheet in the x and y directions, respectively.

14. A printing method according to claim 13, wherein the printing section can carry out printing using an outputted print image in which at least one side of the sheet has an arbitrary size, and the print image is outputted by indicating one side of the sheet to the printing section on the basis of the division numbers inputted using the positive integers for the x and y directions, respectively.

15. A computer program product for executing a printing method utilizing a printing section to which a print image is inputted to carry out no-margin printing according to the inputted print image, the print image having an image beyond the boundary of a sheet to be printed, said printing method comprising the steps of:

dividing, on the basis of an instruction to divide one page of data into a plurality of pieces and to output these pieces on respective pages, a print image corresponding to the sheet to be printed such that each piece of the print image corresponding to a piece of the sheet partly overlaps another piece of the print image corresponding to an adjacent piece of the sheet; and outputting these pieces of the print image to the printing section.

16. A program product according to claim 15, wherein said dividing step includes dividing the print image such that the pieces of the print image corresponding to the adjacent pieces of the sheet overlaps a part of the outside of the sheet to be printed.

17. A program product according to claim 15 or 16, wherein said dividing step includes dividing the print image such that the pieces of the print image corresponding to the adjacent pieces of the sheet overlaps a part of the inside of the sheet to be printed.

18. A program product according to claim 15, wherein said outputting step includes subjecting one page of print data inputted from an input buffering section to affine transformation, dividing the transformed print data, and then outputting the divided print data.

19. A program product according to claim 15, wherein the number of pieces into which the indicated one page of print data is divided is inputted using positive integers for x and y directions of the sheet.

20. A program product according to claim 19, wherein division numbers are calculated for the x and y directions, respectively, on the basis of an inputted value and the sizes of the sheet in the x and y directions, respectively.

21. A program product according to claim 20, wherein the printing section can carry out printing using an outputted print image in which at least one side of the sheet has an arbitrary size, and the print image is outputted by indicating one side of the sheet to the printing section on the basis of the division numbers inputted using the positive integers for the x and y directions, respectively.

* * * * *